(12) United States Patent
Moon et al.

(10) Patent No.: US 9,372,557 B2
(45) Date of Patent: Jun. 21, 2016

(54) DISPLAY APPARATUS, INPUT APPARATUS, AND METHOD FOR COMPENSATING COORDINATES USING THE SAME

(71) Applicant: SAMSUNG ELECTRONICS CO., LTD., Suwon-si (KR)

(72) Inventors: Jong-bo Moon, Suwon-si (KR);
Eun-seok Choi, Anyang-si (KR);
Byung-seok Soh, Hwaseong-si (KR);
Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 87 days.

(21) Appl. No.: 14/146,232

(22) Filed: Jan. 2, 2014

(65) Prior Publication Data
US 2014/0184501 A1 Jul. 3, 2014

(30) Foreign Application Priority Data

Jan. 2, 2013 (KR) .................. 10-2013-0000336
Dec. 23, 2013 (KR) .................. 10-2013-0161058

(51) Int. Cl.
*G06F 3/038* (2013.01)
*H04N 21/422* (2011.01)
(Continued)

(52) U.S. Cl.
CPC ............... *G06F 3/038* (2013.01); *G06F 3/014* (2013.01); *G06F 3/0346* (2013.01); *G06F 3/0482* (2013.01); *G06F 3/04812* (2013.01); *G06F 3/04842* (2013.01); *H04N 21/42222* (2013.01)

(58) Field of Classification Search
CPC ..... G06F 3/038; G06F 3/0482; G06F 3/0346; G06F 3/014; G06F 3/04812; G06F 3/04842; H04N 21/42222

See application file for complete search history.

(56) References Cited

U.S. PATENT DOCUMENTS

| 5,912,659 A | * | 6/1999 | Rutledge et al. ............... 345/156 |
| 7,239,301 B2 | * | 7/2007 | Liberty et al. ................ 345/158 |

(Continued)

FOREIGN PATENT DOCUMENTS

| EP | 2 226 707 A1 | 9/2010 |
| EP | 2 420 925 A2 | 2/2012 |

(Continued)

OTHER PUBLICATIONS

International Search Report, dated Apr. 25, 2014, issued by the International Searching Authority in counterpart International Application No. PCT/KR2014/000010.

(Continued)

*Primary Examiner* — Andrew Sasinowski
(74) *Attorney, Agent, or Firm* — Sughrue Mion, PLLC

(57) ABSTRACT

A display apparatus, an input apparatus, and a method for compensating coordinates using the same. A method for compensating coordinates using a display apparatus includes receiving movement information from an input apparatus, calculating a coordinate value based on the movement information, and displaying a cursor on the calculated coordinate value. When a button selection command is received from the input apparatus, replacing a coordinate value calculated after receiving the button selection command with a coordinate value of a stable position calculated before receiving the button selection command, and displaying the cursor on the replaced coordinate value, and manipulating an item on which the cursor is located according to the button selection command. Accordingly, the user may locate a cursor on the location that the user wants and execute a display item.

23 Claims, 12 Drawing Sheets

(51) Int. Cl.
  *G06F 3/0484* (2013.01)
  *G06F 3/0481* (2013.01)
  *G06F 3/01* (2006.01)
  *G06F 3/0482* (2013.01)
  *G06F 3/0346* (2013.01)

(56) References Cited

U.S. PATENT DOCUMENTS

| | | | |
|---|---|---|---|
| 7,489,298 B2 | 2/2009 | Liberty et al. | |
| 7,839,385 B2 | 11/2010 | Hunleth et al. | |
| 8,169,405 B2 | 5/2012 | Hunleth et al. | |
| 2004/0095317 A1* | 5/2004 | Zhang et al. | 345/158 |
| 2005/0253806 A1 | 11/2005 | Liberty et al. | |
| 2006/0152489 A1* | 7/2006 | Sweetser et al. | 345/158 |
| 2006/0184966 A1 | 8/2006 | Hunleth et al. | |
| 2007/0146319 A1* | 6/2007 | Masselle et al. | 345/157 |
| 2007/0252813 A1 | 11/2007 | Liberty et al. | |
| 2008/0158154 A1 | 7/2008 | Liberty et al. | |
| 2009/0146953 A1* | 6/2009 | Lou | G06F 3/0346 345/163 |
| 2010/0309124 A1* | 12/2010 | Huang et al. | 345/158 |
| 2011/0067068 A1 | 3/2011 | Hunleth et al. | |
| 2011/0157019 A1* | 6/2011 | Miura et al. | 345/163 |
| 2012/0007713 A1* | 1/2012 | Nasiri et al. | 340/5.81 |
| 2012/0127206 A1* | 5/2012 | Thompson et al. | 345/661 |
| 2012/0194429 A1* | 8/2012 | Kwon et al. | 345/157 |
| 2012/0204210 A1 | 8/2012 | Hunleth et al. | |
| 2012/0274560 A1* | 11/2012 | Caritu et al. | 345/158 |

FOREIGN PATENT DOCUMENTS

| | | |
|---|---|---|
| KR | 10-2008-0003788 A | 1/2008 |
| KR | 10-2010-0016444 A | 2/2010 |

OTHER PUBLICATIONS

Written Opinion, dated Apr. 25, 2014, issued by the International Searching Authority in counterpart International Application No. PCT/KR2014/000010.
Communication, dated May 9, 2014, issued by the European Patent Office in counterpart European Application No. 13199895.7.
Konig, Werner A. et al., "Adaptive Pointing—Implicit Gain Adaptation for Absolute Pointing Devices" CHI 2009—Spotlight on Works in Progress, Boston MA, Apr. 4-9, 2009, pp. 4171-4176.
Communication dated Apr. 28, 2015 issued by the European Patent Office in counterpart Application No. 13 199 895.7.

\* cited by examiner

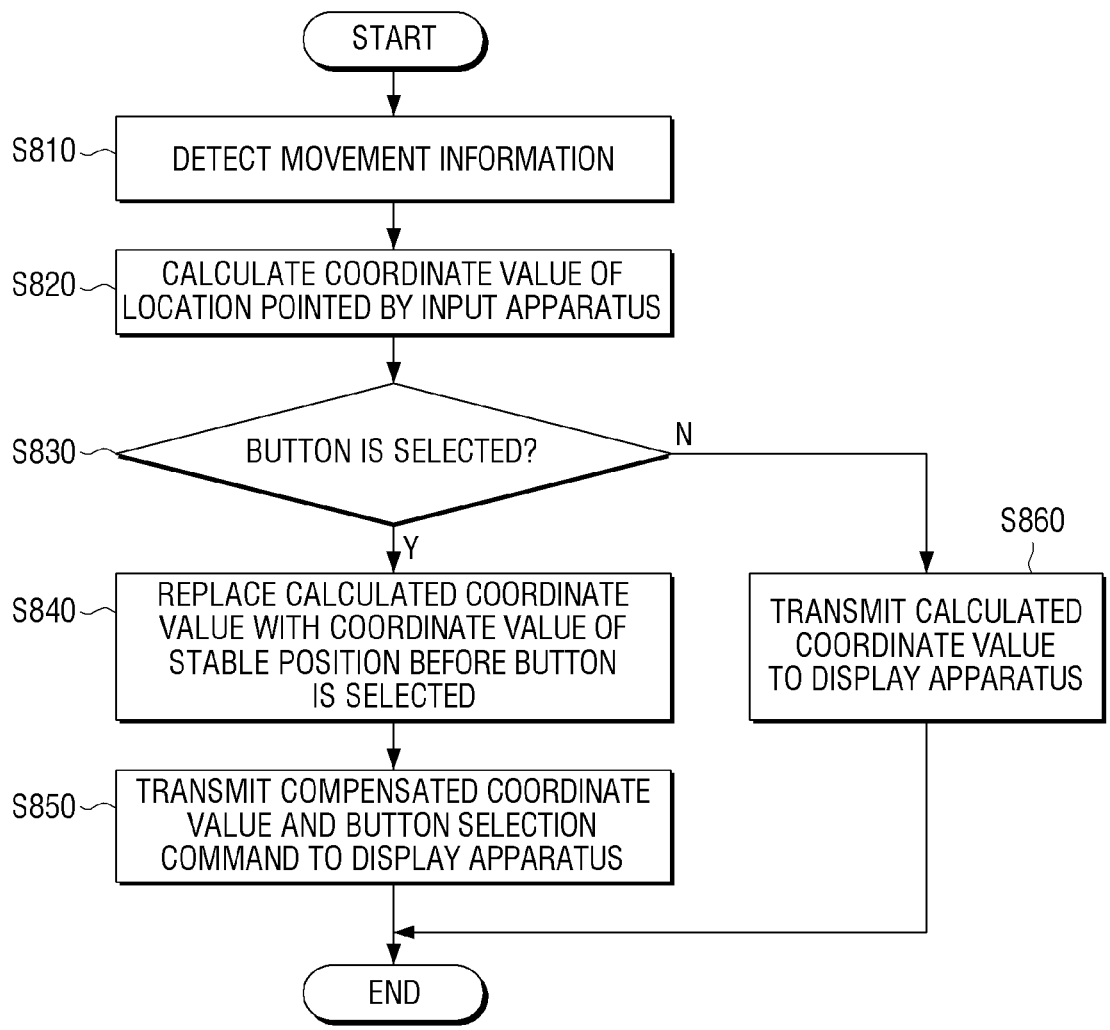

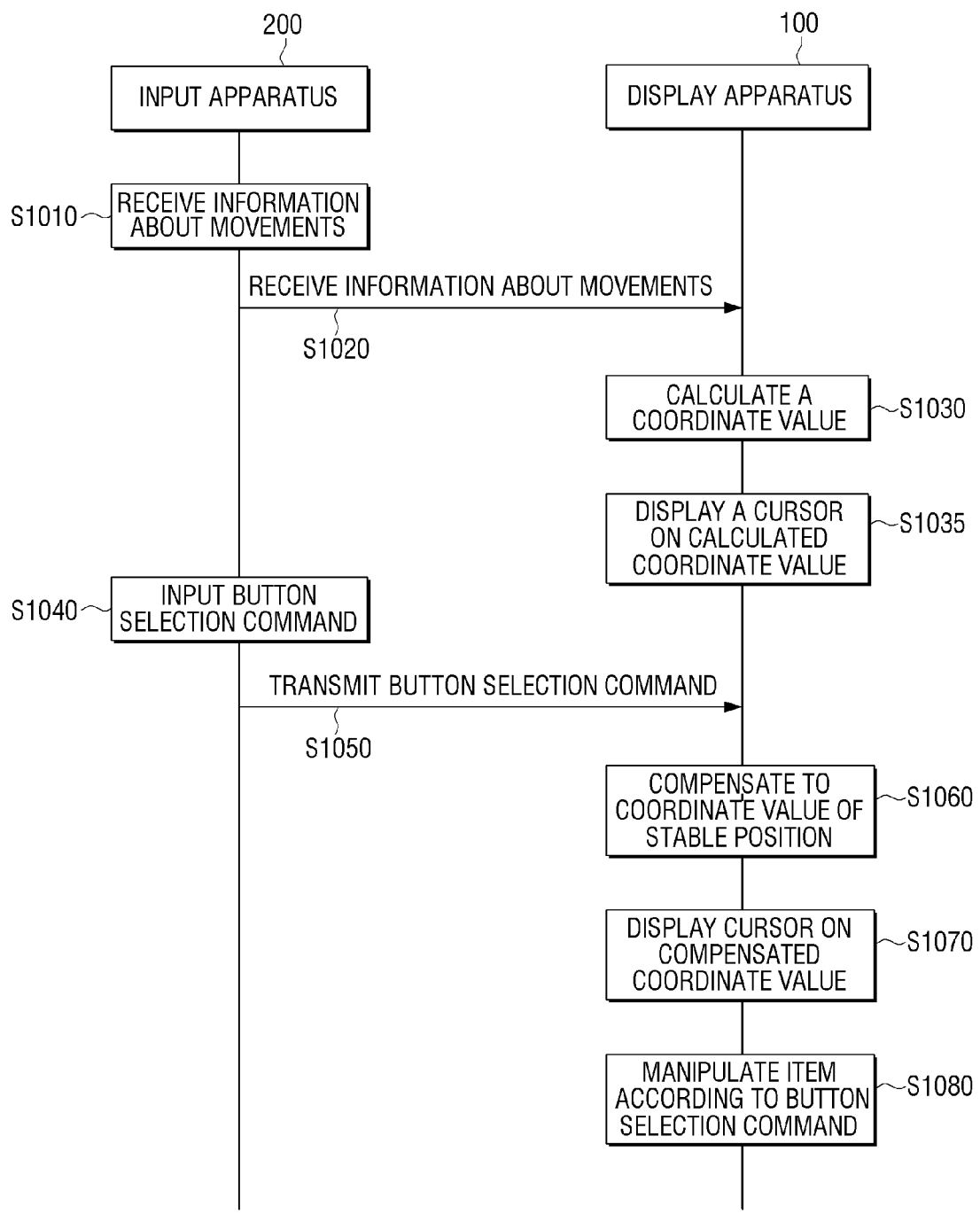

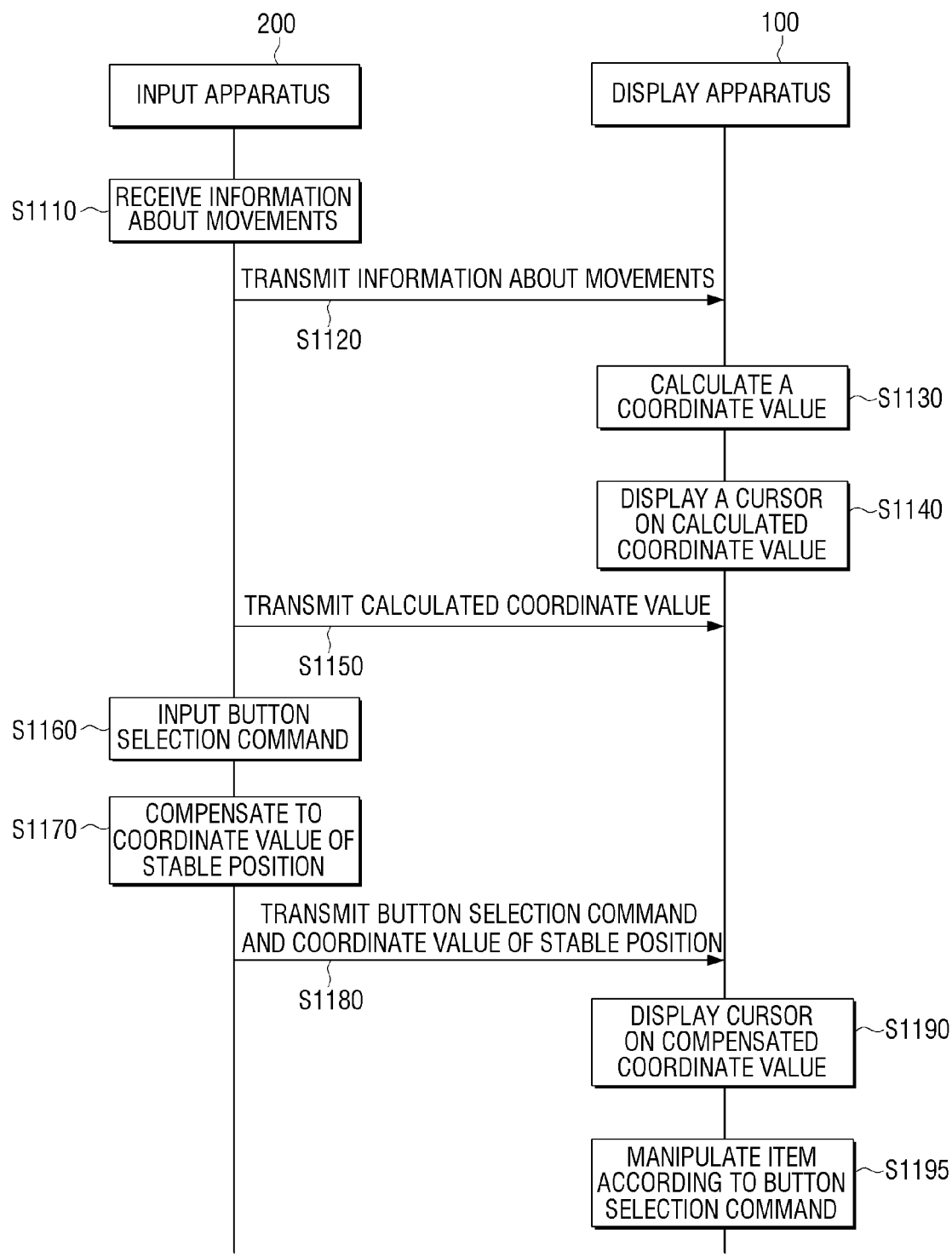

DISPLAY APPARATUS, INPUT APPARATUS, AND METHOD FOR COMPENSATING COORDINATES USING THE SAME

CROSS-REFERENCE TO RELATED APPLICATIONS

This application claims priority from Korean Patent Application No. 10-2013-0000336, filed on Jan. 2, 2013, in the Korean Intellectual Property Office, and Korean Patent Application No. 10-2013-0161058, filed on Dec. 23, 2013, in the Korean Intellectual Property Office, the disclosures of which are incorporated herein by reference in their entirety.

BACKGROUND

1. Field

Apparatuses and methods consistent with exemplary embodiments relate to a display apparatus, an input apparatus, and a method for compensating coordinates using the same, and more particularly, to a display apparatus and an input apparatus which maintain the location pointed by the input apparatus and the location of a cursor that is displayed on the display apparatus and compensate the location of the cursor so as to minimize an error, and a method for compensating coordinates using the same.

2. Description of the Related Art

In the related art, diverse input apparatuses are used to control a cursor displayed on a display apparatus. For example, there are input apparatuses, such as a mouse, that use a relative mapping method of moving the cursor of the display apparatus by detecting relative movements, and input apparatuses, such as a pointing device, that uses an absolute mapping method of moving the cursor to coordinate values of the location pointed by the pointing device.

Recently, input apparatuses of the absolute mapping method, such as the pointing device, have been increasingly used for display apparatuses, such as a smart TV. In particular, when using an input apparatus of the absolute mapping method, such as the pointing device, the location pointed by the pointing device coincides with the location of the cursor on the screen of the display apparatus so that the user can move the cursor more intuitively.

However, when moving the cursor using the pointing device, the pointing device is not fixed or does not have a prop so that the degree of freedom of the movements may increase and thus it may not be easy to place the cursor on a point that the user wants.

In particular, when the size of an item displayed on the display apparatus is small, it is more difficult to place the cursor on the small item using the pointing device. In addition, when selecting a button provided on the pointing device, the pointing device moves regardless of the user's intention so that the location of the cursor may move outside of the item. As a result, it may not be easy to select the item or other items may be selected.

SUMMARY

Exemplary embodiments may overcome the above disadvantages and other disadvantages not described above. Exemplary embodiments are not required to overcome the disadvantages described above, and an exemplary embodiment may not overcome any of the problems described above.

A display apparatus and an input apparatus capable of locating a cursor on the position that the user wants using an input apparatus of the absolute mapping method, such as a pointing device, is provided so as to operate an item, and a method for compensating coordinates using the same is also provided.

A method for compensating coordinates of a display system according to an exemplary embodiment includes receiving movement information and transmitting, by an input apparatus, the received movement information to a display apparatus, calculating by the display apparatus, a coordinate value based on the received movement information, and displaying a cursor on the calculated coordinate value, in response to receiving a button selection command, compensating, by the display apparatus, a coordinate value calculated after receiving the button selection command, and displaying the cursor on the compensated coordinate value; and manipulating an item on which the cursor is located based on the button selection command.

The compensating may compensate the calculated coordinate value to a coordinate value of a stable position in which no change of the calculated coordinate value exists during a predetermined period of time before receiving the button selection command.

The compensating may, when a button selection command is received from the input apparatus while the cursor is located on an item, and when the coordinate value calculated after receiving the button selection command is outside a location of the item, compensate the coordinate value to be within the item if the coordinate value is in a stable position and within the item before said receiving of the button selection command.

The displaying may include additionally compensating the coordinate value calculated after receiving the button selection command according to an instantaneous speed of movements of the input apparatus and displaying the cursor compensated by the additional compensating.

In addition, the additional compensating may, when the instantaneous speed is higher than a first predetermined value, display the cursor by reflecting the coordinate value calculated after receiving the button selection command, and when the instantaneous speed is lower than the second predetermined value, compensate the coordinate value calculated after receiving the button selection command to the previously calculated coordinate value.

The additional compensating may, when the instantaneous speed is higher than the second predetermined value and lower than the first predetermined value, add a weighted value according to the instantaneous speed and compensate the calculated coordinate value.

The compensating may further include determining whether the button selection command is a click command or a drag command by determining at least one of a period of time when the button selection command is received and the change amount of the coordinate value calculated during receiving of the button selection command.

The determining may, when the period of time the button selection command is received is lower than a predetermined period of time, or when the period of time when the button selection command is received is higher than a predetermined period of time, and when the change amount of the calculated coordinate value during receiving the command is lower than a predetermined value, determine the button selection command as a click command.

The determining may, when the period of time when the button selection command is received is higher than a predetermined period of time, and when the change amount of the calculated coordinate value during receiving the command is higher than a predetermined value, determine the button selection command as a drag command.

The manipulating may, when the button selection command is a click command, execute an item on which the cursor is located, when the button selection command is a drag command, and move the item on which the cursor is located along manipulation of the input apparatus.

The input apparatus may be an input apparatus of an absolute mapping method which displays a coordinate value at a location pointed by the input apparatus.

Meanwhile, a display apparatus according to an exemplary embodiment includes a display configured to display at least one of a cursor and an item, a communicator configured to communicate with an external input apparatus; and a controller configured to calculate a coordinate value based on movement information of the input apparatus received through the communicator, configured to display the cursor on the calculated coordinate value, and when a button selection command is received from the input apparatus through the communicator, configured to compensate a coordinate value calculated after receiving the button selection command and configured to control the display to display the cursor on the replaced coordinate value.

The controller may compensate the calculated coordinate value to a coordinate value of a stable position in which no change of the calculated coordinate value exists during a predetermined period of time before receiving the button selection command.

The controller, when a button selection command is received from the input apparatus while the cursor is located on an item and the coordinate value calculated after receiving the button selection command is outside a location of the item, may compensate the coordinate value to be within the item if the coordinate value is in a stable position within the location of the item before receiving the button selection command.

The controller may control the display to additionally compensate the coordinate value calculated after receiving the button selection command according to an instantaneous speed of movements of the input apparatus and controls the display to display a cursor on the additionally compensated coordinate value.

The controller, when the instantaneous speed is higher than a first predetermined value, may display the cursor by reflecting the coordinate value calculated after receiving the button selection command, and when the instantaneous speed is lower than the second predetermined value, compensate the coordinate value calculated after receiving the button selection command to the previously calculated coordinate value.

The controller, when the instantaneous speed is higher than the second predetermined value and lower than the first predetermined value, adds a weighted value according to the instantaneous speed and compensates the calculated coordinate value.

The controller may determine whether the button selection command is a click command or a drag command by determining at least one of a period of time when the button selection command is received and the change amount of the coordinate value calculated during receiving the button selection command.

The controller, when the period of time when the button selection command is received is lower than a first predetermined period of time, or when the period of time when the button selection command is received is higher than a second predetermined period of time, and when the change amount of the calculated coordinate value during receiving the command is lower than a third predetermined value, may determine the button selection command as a click command.

The controller, when the period of time when the button selection command is received is higher than a first predetermined period of time, and when the change amount of the calculated coordinate value during receiving the command is higher than a second predetermined value, may determine the button selection command as a drag command.

The controller, when the button selection command is a click command, may execute an item on which the cursor is located, and when the button selection command is a drag command, move the item on which the cursor is located along manipulation of the input apparatus.

The input apparatus may be an input apparatus of an absolute mapping method which displays a coordinate value at a location pointed by the input apparatus.

An input apparatus to control a cursor displayed on a display apparatus include a button configured to receive a selection command; a detector configured to detect movements of the input apparatus; a communicator configured to communicate with the display apparatus; and a controller configured to receive movements of the input apparatus detected by the detector and configured to calculate a coordinate value of a location pointed by the input apparatus, and when the button is selected, configured to replace a coordinate value calculated after the button is selected with a coordinate value of a stable position calculated before the button is selected, and controls the communicator to transmit the selection command and information about the replaced coordinate value to the display apparatus.

Meanwhile, a display system according to an exemplary embodiment includes an input apparatus configured to detect information about movements and receive a button transmission command, and a display configured to receive information about movements from the input apparatus, display a cursor on the calculated coordinate value, when a button selection command is received from the input apparatus, compensate a coordinate value calculated after receiving the button selection command to a coordinate value of the stable position before receiving the button selection command and display a cursor on the compensated coordinate value, and manipulate an item on which the cursor is located according to the button selection command.

Additional and/or other aspects of exemplary embodiments will be set forth in part in the description which follows and, in part, will be obvious from the description, or may be learned by practice of one or more of exemplary embodiments.

BRIEF DESCRIPTION OF THE DRAWING FIGURES

The above and/or other aspects will be more apparent by describing certain exemplary embodiments with reference to the accompanying drawings, in which:

FIG. 8 is a flow chart illustrating a method for compensating coordinates using an input apparatus according to another exemplary embodiment.

FIGS. 10 and 11 are sequence diagrams illustrating a method for compensating a coordinate of a display system according to an exemplary embodiment.

DETAILED DESCRIPTION OF EXEMPLARY EMBODIMENTS

Figure 1:
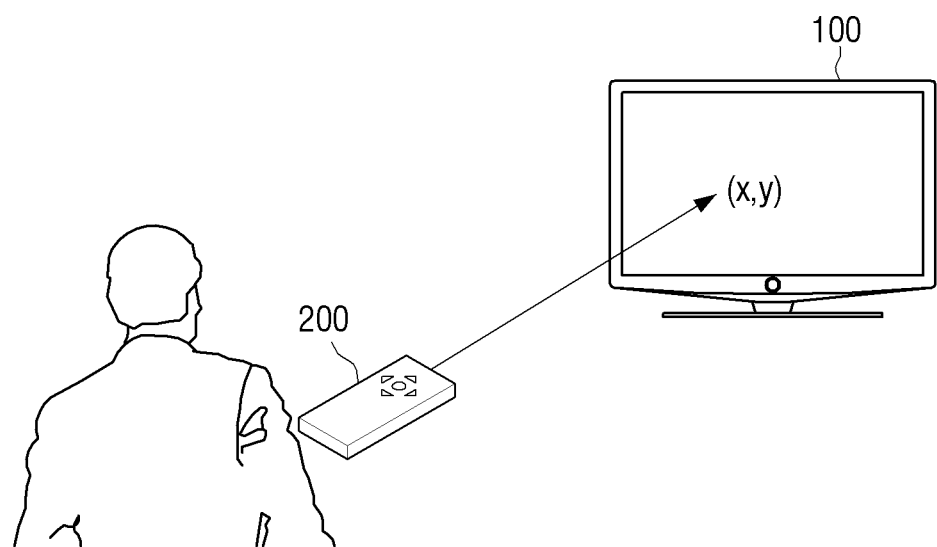
FIG. 1 is a view illustrating a display system according to an exemplary embodiment.

Certain exemplary embodiments will now be described in greater detail with reference to the accompanying drawings.

In the following description, same drawing reference numerals are used for the analogous elements even in different drawings. The matters defined in the description, such as detailed construction and elements, are provided to assist in a comprehensive understanding of exemplary embodiments. Thus, it is apparent that the exemplary embodiments can be carried out without those specifically defined matters. Also, well-known functions or constructions are not described in detail since they would obscure exemplary embodiments with unnecessary detail.

FIG. 1 is a view illustrating a display system including a display apparatus 100 and an input apparatus 200 according to an exemplary embodiment. As shown in FIG. 1, the display apparatus 100 may be a smart TV but it is merely an example. The display apparatus 100 may also be a desktop computer, a tablet personal computer (PC), a smart phone, etc. The input apparatus 200 may be a pointing device as shown in FIG. 1, but it is merely an example. The input apparatus 200 may be implemented in diverse devices, such as a digital pen.

The input apparatus 200 detects its own movement as manipulated by the user and transfers the movement information to the display apparatus 100. The input apparatus 200 may detect its own movement using a 9-axis sensor, and the movement information may include movement information regarding a yaw angle, a pitch angle, and a roll angle.

The display apparatus 100 receives the movement information of the input apparatus 200 and calculates a coordinate value of the location pointed by the input apparatus 200. More specifically, the display apparatus 100 may determine the movement information regarding the yaw angle, the pitch angle, and the roll angle of the input apparatus 200 and calculate a coordinate value of the location pointed by the input apparatus 200. At this time, the display apparatus 100 may compensate the calculated coordinate value by determining an instantaneous speed of the input apparatus 200 at the calculated coordinate value.

Subsequently, the display apparatus 100 displays a cursor on the calculated coordinate value or on the compensated coordinate value.

Subsequently, the display apparatus 100 determines whether a button selection command is input from the input apparatus 200. When the button selection command is received from the input apparatus 200, the display apparatus 100 may replace a coordinate value calculated after receiving the button selection command with a coordinate value of a stable position calculated before receiving the button selection command. The coordinate value of the stable position is a coordinate value of a section in which there is no changes in the calculated coordinate value during a predetermined period of time before the display device 100 receives the button selection command. For example, the stable position may be the same coordinate value for a predetermined period of time e.g., 3 seconds. In an exemplary embodiment, the last stable position before the button selection command is input is determined.

Subsequently, the display apparatus 100 displays the cursor on the coordinate value of the stable position, and manipulates an item on which the cursor is placed according to the button selection command. When the display apparatus 100 determines that the button selection command is a click, the display apparatus 100 may execute the item, or when the display apparatus 100 determines that the button selection command is a drag, the display apparatus 100 may move the item along the movement of the input apparatus 200 i.e., to correspond to the movement of the input apparatus 200.

In the display system according to an exemplary embodiment, the user may place the cursor on a point that he or she wants using the input apparatus 200 of the absolute mapping method, such as a pointing device, and execute display items.

A configuration of a display system according to one or more exemplary embodiments is described below in detail with reference to FIGS. 2 to 5.

Figure 2:
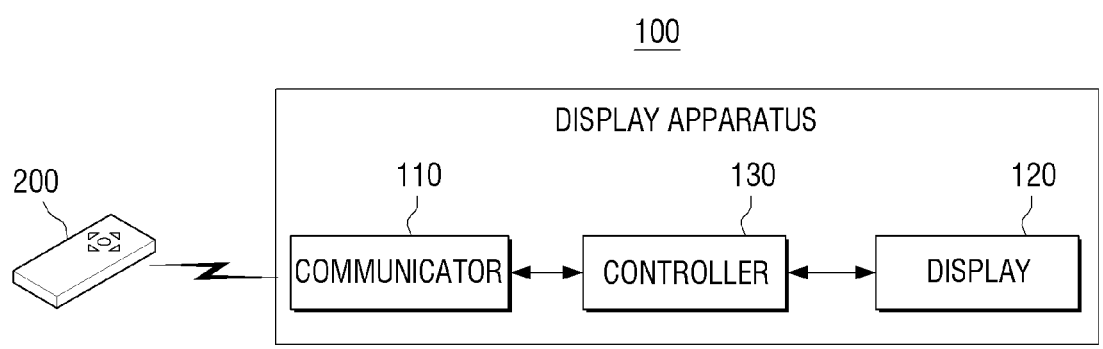
FIG. 2 is a block diagram illustrating a configuration of a display apparatus according to an exemplary embodiment.

FIG. 2 is a block diagram illustrating a configuration of a display apparatus according to an exemplary embodiment. As shown in FIG. 2, the display apparatus 100 may include a communicator 110, a display 120, and a controller 130.

The communicator 110 communicates with an external input apparatus 200. The communicator 110 may receive at least one of movement information of the input apparatus 200 and a button selection command from the input apparatus 200.

The display 120 outputs image data according to control of the controller 130. In particular, the display 120 may display a cursor on the coordinates pointed by the input apparatus 200. In addition, the display 120 may display items capable of performing diverse functions.

The controller 130 controls the overall operations of the display apparatus 100. More specifically, when movement information is received from the input apparatus 200 through the communicator 110, the controller 130 calculates a coordinate value of the location pointed by the input apparatus 200, and controls the display 120 to display the cursor on the calculated coordinate value. In addition, when a button selection command is received from the input apparatus 200 through the communicator 110, the controller 130 replaces a coordinate value calculated after receiving the button selection command with a coordinate value of the stable position calculated before receiving the button selection command, and controls the display 120 to display the cursor on the compensated coordinate value. Subsequently, the controller 130 manipulates the item on which the cursor is placed during the stable position according to the button selection command as opposed to the actual coordinate value which may be a result of an unwanted movement by a user.

More specifically, when the movement information is received from the input apparatus 200 through the communicator 110, the controller 130 may calculate a coordinate value of the location pointed by the input apparatus 200 based on the movement information of the input apparatus 200. The movement information of the input apparatus 200 may include movement information regarding at least one of a yaw angle, a pitch angle, and a roll angle.

At this time, the controller 130 may compensate the calculated coordinate value according to the instantaneous speed of the input apparatus 200 at the calculated coordinate value. More specifically, when the instantaneous speed of the input apparatus 200 at the calculated coordinate value is equal to or higher than a predetermined maximum value, the controller 130 may reflect the calculated coordinate value as it is i.e., the actual calculated coordinate value and control the display 120 to display the cursor on the calculated coordinate value. When the instantaneous speed of the input apparatus 200 at the calculated coordinate value is lower than a predetermined minimum value, the controller 130 may replace the calculated coordinate value with a previously calculated coordinate value, and control the display 120 to display the cursor on the previously calculated coordinate value. That is, when the instantaneous speed of the input apparatus 200 at the calculated coordinate value is lower than the predetermined minimum value, the controller 130 may not move the cursor i.e., may not change the location of the cursor and may continue to display the cursor on the previous coordinate value. When the instantaneous speed of the input apparatus 200 at the calculated coordinate value is equal to or higher than the minimum value and is lower than the maximum value, the controller 130 may replace the calculated coordinate value with a coordinate value ranging between the currently calculated coordinate value and the previously calculated coordinate value according to the determined instantaneous speed of the input apparatus 200, and control the display 120 to display the cursor at the replacement coordinate value i.e., substitute coordinate value which may range between the currently calculated coordinate value and the previously calculated coordinate value. At this moment, as the instantaneous speed of the input apparatus 200 becomes closer to the maximum value, the controller 130 may add a weighted value on the calculated coordinate value and compensate the coordinate value. Herein, the weighted value is between 0 and 1, which can be proportional to instantaneous speed of a display. That is, compensate the coordinate value to become closer to the currently calculated coordinate value and control the display 120 to display the cursor on the compensated coordinate value, and as the instantaneous speed of the input apparatus 200 becomes closer to the minimum value, the controller 130 may compensate the coordinate value to become closer to the previously calculated coordinate value and control the display 120 to display the cursor on the compensated coordinate value.

By the above exemplary compensating operations, the display apparatus 100 may minimize the unwanted or unintended movements of the cursor based on the movements of the input apparatus 200. That is, the display apparatus 100 may at least partially eliminate the movements of the cursor that the user did not intend.

When a button selection command is received from the input apparatus 200 through the communicator 110 while displaying the cursor, the controller 130 may replace a coordinate value calculated after receiving the button selection command with a coordinate value of the stable position calculated before receiving the button selection command, and display the cursor on the compensated coordinate value. Subsequently, the controller 130 may manipulate an item on which the cursor is located according to the button selection command in an exemplary embodiment.

More specifically, the controller 130 determines whether a period of time when the button selection command is received is lower than a predetermined period of time (e.g., 1 second). When the period of time when the button selection command is received is equal to or lower than the predetermined period of time, the controller 130 may determine that the button selection command is a click, may replace a coordinate value calculated after receiving the button selection command with a coordinate value of the stable position, and may execute an item on which the cursor that is displayed on the compensated coordinate value is located.

When the period of time when the button selection command is received is higher than the predetermined period of time, the controller 130 may then determine a change amount of a coordinate value calculated while the button selection command is received. In an exemplary embodiment, the change amount of the coordinate value may indicate a distance or a difference between the initial coordinate value at which the button selection command was pressed and a final or current coordinate value at which the button selection command was released or as preset in the system e.g., after a predetermined period of time such as 3 second. When the change amount of the calculated coordinate value is lower than a predetermined value i.e., the difference between the initial coordinate value at the time the button selection command was pressed and the coordinate value after a predetermined period of time, the controller 130 may determine that the button selection command is a click, may replace a coordinate value calculated after receiving the button selection command with a coordinate value of the stable position, and may execute an item on which the cursor that is displayed on the compensated coordinate value is located.

However, when the change amount of the calculated coordinate value is equal to or higher than the predetermined value, the controller 130 may determine that the button selection command is a drag, may reflect the change amount of the coordinate value calculated while the button of the input apparatus 200 is being selected, and may control the display 120 to move the item on which the cursor is located along the movements of the input apparatus 200 i.e. to correspond to the movement of the input apparatus.

As described above, according to an exemplary embodiment, while the button of the input apparatus 200 is being selected, the movements that the user does not intend are compensated for so that the display apparatus 100 can perform manipulation of the item that the user wants.

Figure 3:
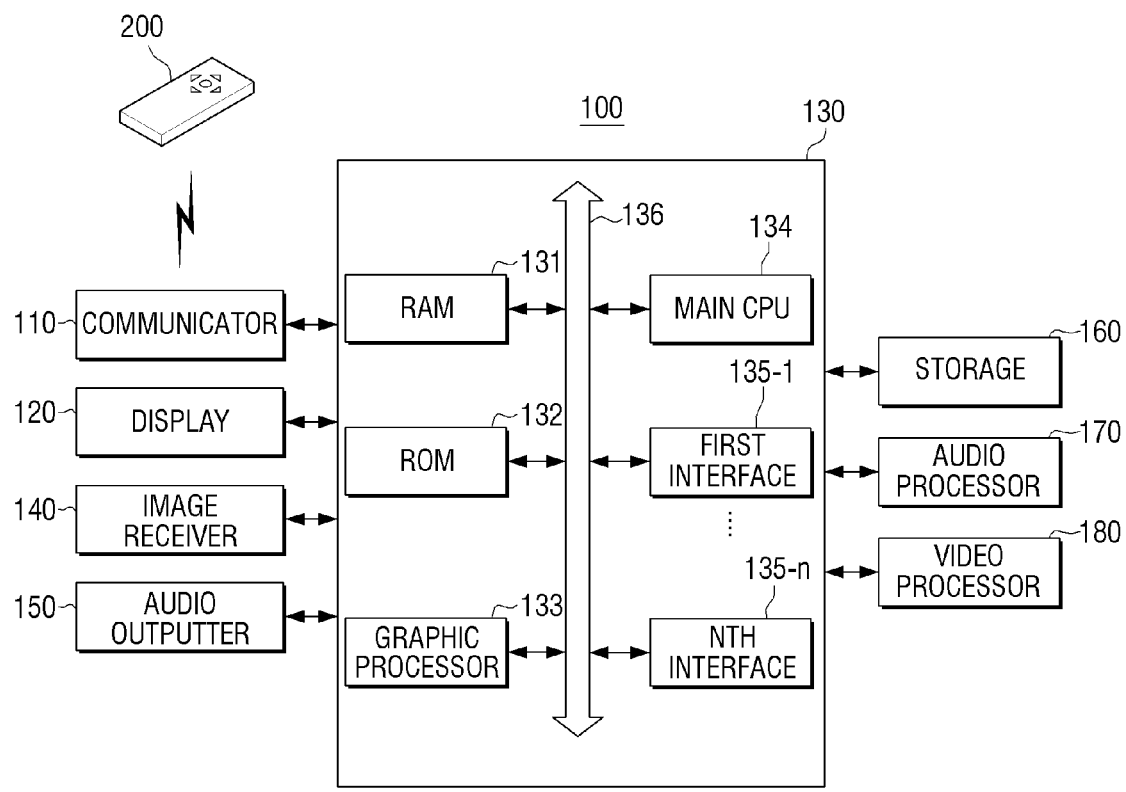
FIG. 3 is a block diagram illustrating a configuration of a display apparatus according to an exemplary embodiment.

FIG. 3 is a block diagram illustrating a configuration of a display apparatus 100 according to an exemplary embodiment. As shown in FIG. 3, the display apparatus 100 may include a communicator 110, a display 120, a controller 130, an image receiver 140, an audio outputter 150, a storage 160, an audio processor 170, and a video processor 180.

The communicator 110 communicates with diverse types of external devices according to diverse types of communication methods according to an exemplary embodiment. The communicator 110 may include diverse communication chips such as a Wi-Fi chip, a Bluetooth chip, a near field communication (NFC) chip, a wireless communication chip, etc. The Wi-Fi chip, the Bluetooth chip, and the NFC chip perform communication in Wi-Fi method, Bluetooth method, and NFC method, respectively. The NFC chip is a chip that operates in the NFC method which uses the 13.56 MHz band from among diverse radio frequency identification (RFID) frequency bands such as 135 kHz, 13.56 MHz, 433 MHz, 860-960 MHz, and 2.45 GHz. When using the Wi-Fi chip or the Bluetooth chip, diverse connection information, such as a subsystem identification (SSID) and a session key, are transmitted and received first, and then when communication is connected, diverse information can be transmitted and received. The wireless communication chip is a chip that performs communication according to diverse communication standards such as IEEE, Zigbee, $3^{rd}$ generation (3G), $3^{rd}$ generation partnership project (3GPP), and long term evolution (LTE).

In particular, the communicator 110 may communicate with an external input apparatus 200, and receive movement information and a button selection command from the input apparatus 200.

The display 120 displays a video frame obtained by processing image data received from the image receiver 140 using the video processor 180 or diverse screens generated by the graphic processor 133. In particular, the display 120 may display a cursor and at least one display item.

The image receiver 140 receives image data from diverse sources. For example, the image receiver 140 may receive broadcasting data from an external broadcasting station or receive image data from an external device (e.g., a digital versatile disk (DVD) player).

The audio outputter 150 outputs diverse audio data processed by the audio processor 170, diverse notification sounds, and voice messages.

The storage 160 stores diverse modules to operate the display apparatus 100. For example, the storage 160 may store software including a base module, a sensing module, a communication module, a presentation module, a web browser module, and a service module. The base module is a basic module for processing a signal transmitted from hardware included in the display apparatus 100 and transmitting the signal to a module at an upper layer. The sensing module collects information from diverse kinds of sensors and analyzes and manages the collected information, and may include a face recognition module, a voice recognition module, a motion recognition module, an NFC recognition module, and so on. The presentation module constitutes a display screen, and may include a multimedia module for reproducing and outputting multimedia content, and a user interface (UI) rendering module for processing an UI and graphics. The communication module communicates with external devices. The web browser module performs web browsing and accesses a web server. The service module includes diverse applications for providing diverse services.

As described above, the storage 160 may include diverse program modules. In addition, it is possible to remove, modify, or add some program modules according to the type or characteristics of the display apparatus 100. For example, when the display apparatus 100 is a tablet PC, the storage 160 may further include a location determination module for determining the location based on global positioning system (GPS) as a base module, and a sensing module for sensing the user's gesture.

The audio processor 170 processes audio data. The audio processor 170 may perform diverse processes for audio data, such as decoding, amplification, and noise filtering. The processed audio data are output to the audio outputter 150.

The video processor 180 processes image data received from the image receiver 140. The video processor 180 may perform diverse processes for image data, such as decoding, scaling, noise filtering, frame rate conversion, and resolution conversion.

The controller 130 controls the overall operations of the display apparatus 100 using diverse programs stored in the storage 160.

As shown in FIG. 3, the controller 130 may include a random-access memory (RAM) 131, a read-only memory (ROM) 132, a graphic processor 133, a main central processing unit (CPU) 134, first to $n^{th}$ interfaces 135-1 to 135-n, and a bus 136. The RAM 131, the ROM 132, the graphic processor 133, the main central processing unit (CPU) 134, and the first to $n^{th}$ interfaces 135-1 to 135-n may be connected to one another via the bus 136.

The ROM 132 stores a set of commands for booting up the system. When a turn-on command is input and the power is supplied, the main CPU 134 copies an operating system (OS) stored in the storage 160 to the RAM 141 and executes the OS according to the commands stored in the ROM 132 so that the system can boot up. When the boot-up is complete, the main CPU 134 copies diverse application programs stored in the storage 160 to the RAM 131 and executes the copied application programs so that diverse operations can be performed.

The graphic processor 133 generates a screen including diverse objects, such as a cursor, an icon, an image, and text, using an operator (not shown) and a renderer (not shown). The operator operates property values of each object, such as a coordinate value, shape, size and color, according to layout of the screen using a control command received from an input unit. The renderer generates a screen having diverse layout including the objects based on the property values operated by the operator. The screen generated by the renderer is displayed on a display area of the display 120.

The main CPU 134 access the storage 160 and boots up the system using the OS stored in the storage 160. In addition, the main CPU 134 performs diverse operations using diverse programs, content, and data which are stored in the storage 160.

The first to $n^{th}$ interfaces 135-1 to 135-n are connected to the aforementioned components. One of the interfaces may be a network interface that is connected to an external device through a network.

In particular, in an exemplary embodiment, when movement information is received from the input apparatus 200 through the communicator 110, the controller 130 calculates a coordinate value of the location pointed by the input apparatus 200 based on the movement information of the input apparatus 200. The movement information of the input apparatus 200 may include movement information regarding at least one of a yaw angle, a pitch angle, and a roll angle of the input apparatus 200. That is, the controller 130 may calculate the coordinate value of the location pointed by the input apparatus 200 by analyzing the movement information regarding the yaw angle, the pitch angle, and the roll angle which are transmitted from the input apparatus 200 in real time.

At this moment, the controller 130 may compensate the calculated coordinate value according to the instantaneous speed of the calculated coordinate value. The exemplary embodiment of compensating the calculated coordinate value according to the instantaneous speed of the input apparatus 200 at the calculated coordinate value is described below in greater detail with reference to FIG. 4.

Firstly, the controller 130 calculates an instantaneous angular speed of the input apparatus 200 using an angular amount of subtracting a previous angle from a current angle as shown in Mathematical Formula 1 below according to an exemplary embodiment. At this time, the controller 130 may calculate an average angular speed per second by adding up an angular amount as much as the sampling rate.

[Mathematical Formula 1]

$$\text{Speed}_n = \sum_{i=n-SamplingRate}^{n} (|\theta_i - \theta_{i-1}| + |\phi_i - \phi_{i-1}|)$$

Subsequently, the controller 130 may calculate a compensated angular speed ($\text{Spêed}_n$) by compensating the calculated angular speed according to a predetermined maximum value and a predetermined minimum value of the angular speed as in Mathematical Formula 2 below.

[Mathematical Formula 2]

$$\hat{Speed}_n = \begin{cases} \dfrac{Speed_{min}}{Speed_{max}} & \text{if } Speed_{min} \geq Speed_n \\ 1 & \text{if } Speed_{max} \geq Speed_n \\ \dfrac{Speed_n}{Speed_{max}} & \text{otherwise,} \end{cases} \hat{Speed}_n = \{x \mid 0 < x \leq 1\}$$

Subsequently, the controller 130 may calculate a smooth factor using the compensated angular speed as in Mathematical Formula 3 below.

[Mathematical Formula 3]

$$SmoothFactor_n = \dfrac{1 - \cos(\hat{Speed}_n \times \pi)}{2},$$

$$SmoothFactor_n = \{x \mid 0 \leq x < 1\}$$

Subsequently, the controller 130 may calculate a compensated coordinate value using the currently calculated coordinate value ($P_n(x,y)$), the previously calculated coordinate value ($P_{n-1}(x,y)$), and the smooth factor as in Mathematical Formula 4 below.

$$\hat{P}_n(x,y) = (1-SmoothFactor) \times P_n(x,y) + (SmoothFactor) \times \hat{P}_{n-1}(x,y)$$ [Mathematical Formula 4]

Based on Mathematical Formulas 1 to 4, when the instantaneous speed of the input apparatus 200 at the calculated coordinate value is equal to or higher than the predetermined maximum value, the controller 130 may reflect the actual calculated coordinate value and control the display 120 to display the cursor on the calculated coordinate value. When the instantaneous speed of the input apparatus 200 at the calculated coordinate value is lower than the predetermined minimum value, the controller 130 may not move the cursor i.e., may not change the location of the cursor and may display the cursor on the previous coordinate value. When the instantaneous speed of the input apparatus 200 at the calculated coordinate value is equal to or higher than the minimum value and is lower than the maximum value, the controller 130 can control the display 120 to compensate a coordinate value in accordance with the weighted value and display a cursor. Specifically, the controller 130 can calculate the weighted value between 0 and 1 in proportion to instantaneous speed and calculate a compensated coordinate value by multiplying a currently-calculated coordinate value with the calculated weighted value. That is, as the instantaneous speed of the input apparatus 200 becomes closer to the maximum value, the controller 130 may compensate the coordinate value to become closer to the currently calculated coordinate value and control the display 120 to display the cursor on the compensated coordinate value, and as the instantaneous speed of the input apparatus 200 becomes closer to the minimum value, the controller 130 may compensate the coordinate value to become closer to the previously calculated coordinate value and control the display 120 to display the cursor on the compensated coordinate value.

Figure 4:
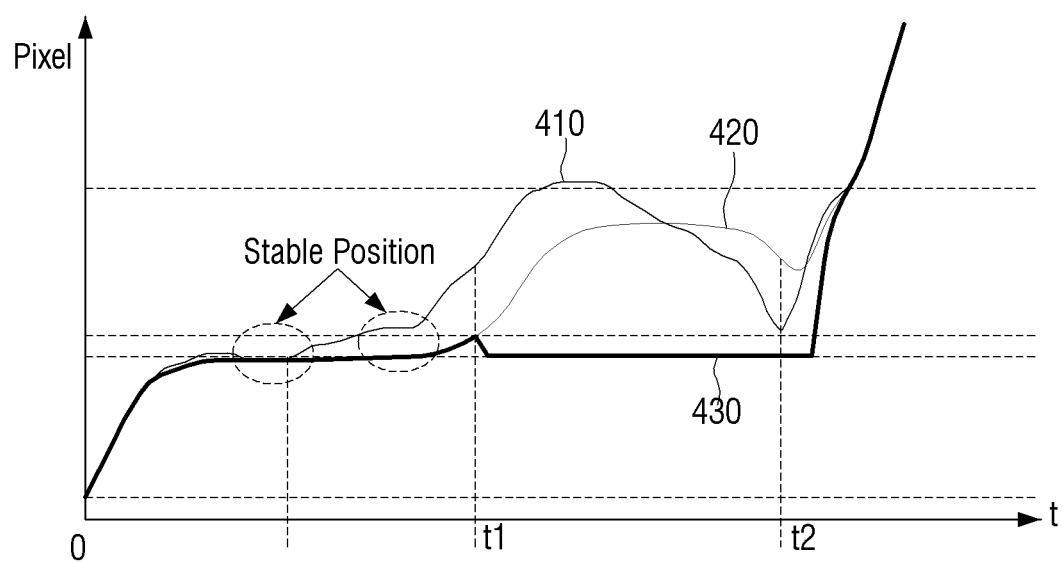
FIG. 4 is a graph illustrating a method for compensating coordinates using an input apparatus according to an exemplary embodiment.

That is, as shown in FIG. 4, when the calculated y-coordinate value varies over time as shown in the first line 410 according to an exemplary embodiment, the controller 130 may compensate the calculated y-coordinate value as shown in the second line 420 by using compensation of Mathematical Formulas 1 to 4. By the above compensating operations, the display apparatus 100 may minimize the movements of the cursor by the movements of the input apparatus 200 that the user does not intend.

When a button selection command is received from the input apparatus 200 while compensating the calculated coordinate value, the controller 130 determines whether the received button selection command is a click or a drag. More specifically, the controller 130 determines whether a period of time when the button selection command is received is lower than a predetermined period of time (e.g., 1 second). When the period of time when the button selection command is received is equal to or lower than the predetermined period of time, the controller 130 may determine that the button selection command is a click. When the period of time when the button selection command is received is higher than the predetermined period of time, the controller 130 may determine a change amount of a coordinate value calculated while the button selection command is received, as explained above by way of an example. When the change amount of the calculated coordinate value is lower than a predetermined value, the controller 130 may determine that the button selection command is a click. However, when the change amount of the calculated coordinate value is equal to or higher than the predetermined value, the controller 130 may determine that the button selection command is a drag.

When it is determined that the button selection command is a click, the controller 130 may replace a coordinate value calculated after receiving the button selection command to a coordinate value of a stable position calculated before receiving the button selection command, and display the cursor on the compensated coordinate value. The coordinate value of the stable position is a coordinate value of a section in which there is no changes in the calculated coordinate value during a predetermined period of time before receiving the button selection command. More specifically, the controller 130 may calculate the coordinate value of the stable position using Mathematical Formulas 5 and 6 below according to an exemplary embodiment.

[Mathematical Formula 5]

$$\dfrac{S_n}{Most\_lately\_Stable\_Angle} =$$

$$\begin{cases} Angle_n & \text{if } \hat{Speed}_n < Minimum\_Speed\_Threshold \\ S_{n-1} & \text{otherwise} \end{cases}$$

[Mathematical Formula 6]

$$\dfrac{C_n}{Current\_Stable\_Angle} =$$

$$\begin{cases} Max[Angle_{n-a}, \ldots, Angle_n, S_n] & \text{if } Angle_n - Angle_{n-1} < -Threshold \\ Min[Angle_{n-a}, \ldots, Angle_n, S_n] & \text{if } Angle_n - Angle_{n-1} > Threshold \\ Angle_n & \text{otherwise} \end{cases}$$

That is, when a button selection command is received from the input apparatus 200 at t1 of FIG. 4 according to an exemplary embodiment, the controller 130 may replace a coordinate value calculated after receiving the button selection command with a coordinate value of a section in a stable position calculated before receiving the button selection command as shown in the third line 430 of FIG. 4. Subsequently, the controller 130 executes an item on which the cursor is located at the stable position according to the button selection command.

However, when it is determined that the button selection command is a drag, the controller 130 may calculate a coordinate value along the movements of the input apparatus 200, and move an item on which the cursor is located at the stable position along the calculated coordinate values.

At t2 of FIG. 4, when receiving the button selection command is stopped, the controller 130 may calculate and compensate a coordinate value and control the display 120 to move the cursor.

Hereinafter, a method for compensating movements of a cursor will be described in reference to FIGS. 9a and 9b according to an exemplary embodiment.

First, the controller 130 can control the display 120 to display a list including a plurality of items 910-1 to 910-8.

Figure 9A:
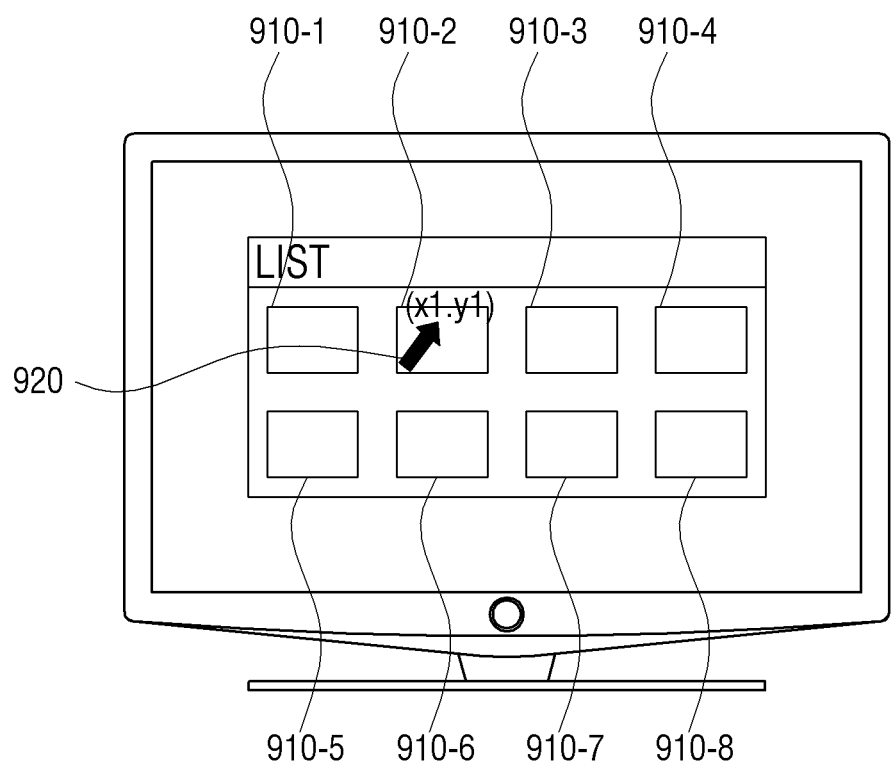
FIGS. 9a and 9b are views illustrating compensating movements of a cursor according to an exemplary embodiment.

And, the controller 130 can calculate a coordinate value (x1, y1) by using information on movements of the input apparatus 200 and locate a cursor on a second item 910-2, as illustrated in FIG. 9a. At this time, the controller 130 can detect that the calculated coordinate value x1, y1 does not change for a predetermined time.

In addition, when a button selection command is input from the input apparatus 200, the controller 130, after receiving a button selection command, can compensate a coordinate value of the stable position before receiving a button selection command.

Figure 9B:
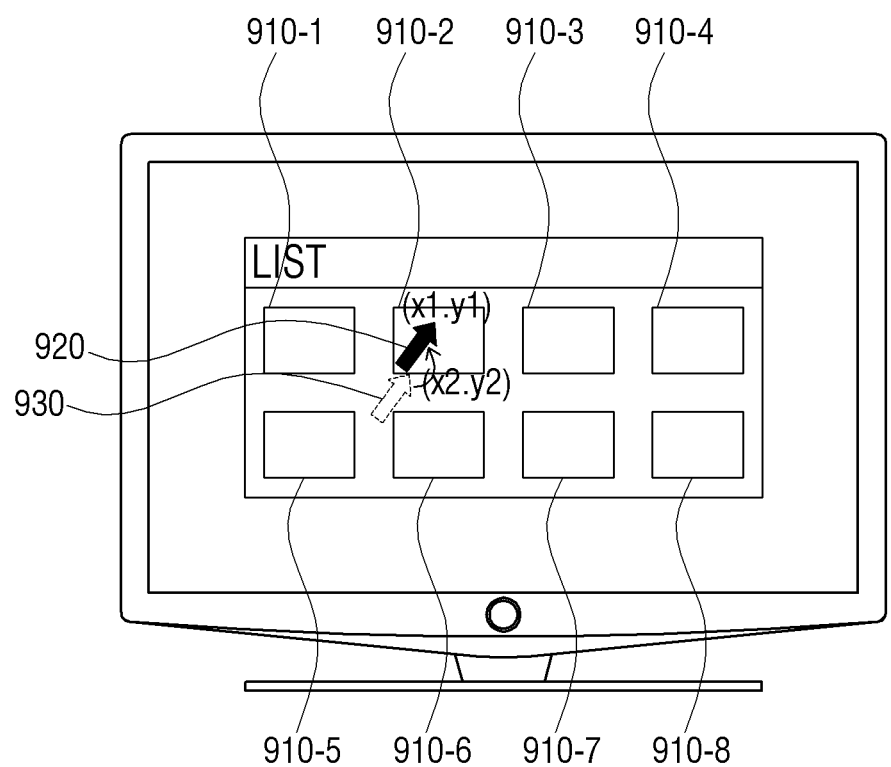

Specifically, when movements are detected by the input apparatus 200 by a button selection command, the controller 130, as illustrated in a dotted line in FIG. 9b, can calculate a coordinate value calculated after receiving a button selection command as a coordinate value (x2, y2) outside the second item 910-2.

However, the controller 130 can compensate a coordinate value calculated after receiving a button selection command to a coordinate value (x1, y1) which has no change of a coordinate value calculated during a predetermined time before receiving a button selection command.

Therefore, the controller 130, when receiving a button selection command from the input apparatus 200 while a cursor is located on an item, even though a coordinate value calculated after receiving a button selection command exceeds an item, if a coordinate value of a stable position before receiving a button selection command exists, can compensate a coordinate value of the cursor 920 within an item. When the user selects the button in the method described above according to an exemplary embodiment, input errors may be minimized.

In the above exemplary embodiment, a coordinate value is calculated using the movement information of the input apparatus 200 received from the input apparatus 200, but this is merely an example. It is also possible to calculate a coordinate value of the location pointed by the input apparatus 200 in other methods. For example, when the input apparatus 200 is a digital pen, the display apparatus 100 may calculate a coordinate value of the location pointed by the input apparatus 200 by receiving a light signal emitted by the digital pen.

In addition, in the above exemplary embodiment, the absolute mapping method of displaying the cursor on a coordinate value pointed by the input apparatus 200 has been applied, but it is merely an example. It is also possible to apply an exemplary embodiment to the relative mapping method of calculating a coordinate value using relative movements of the input apparatus 200 and displaying the cursor.

Furthermore, in FIG. 4, the method for compensating the y-coordinate value is shown, but a method for compensating the x-coordinate value is analogous according to an exemplary embodiment. However, this is provided by way of an example only and not by way of a limitation. It is possible to use different thresholds for different coordinates i.e., x-coordinates may have different threshold values from the y-coordinates. The difference may be based on knowledge of user actions and the input apparatus. For example, if the button is located on a right side of the input apparatus, it is possible that the user will move the input apparatus to the right when reaching for the button. Accordingly, the x-axis may have a different threshold value as opposed to the y-axis to compensate for the predicted unintended movement of the input apparatus to the right.

In the above exemplary embodiment, the display apparatus 100 compensates a coordinate value of the location pointed by the input apparatus 200, but it is merely an example. The input apparatus 200 may directly compensate a coordinate value and transmit the compensated coordinate value to the display apparatus 100.

Figure 5:
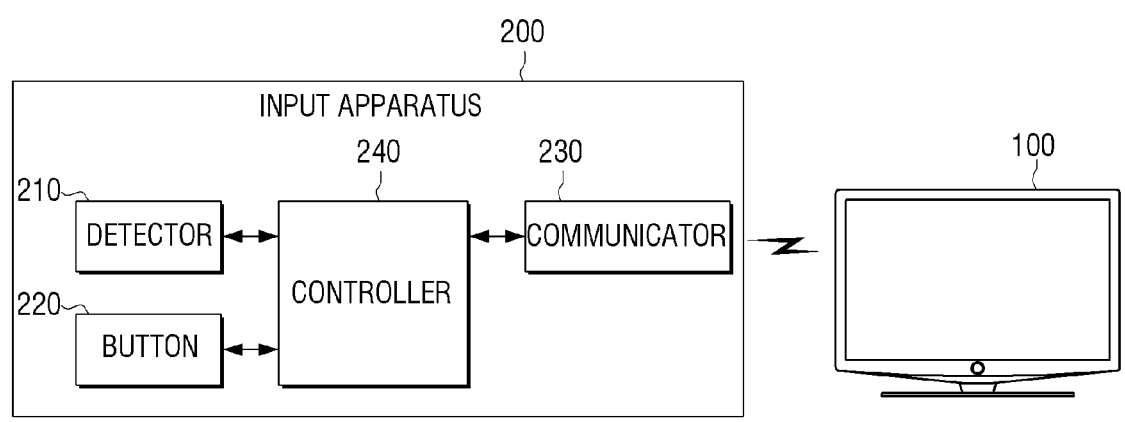
FIG. 5 is a block diagram illustrating a configuration of an input apparatus according to an exemplary embodiment.

FIG. 5 is a block diagram illustrating a configuration of an input apparatus 200 according to an exemplary embodiment. As shown in FIG. 5, the input apparatus 200 may include a detector 210, a button 220, a communicator 230, and a controller 240.

The detector 210 detects the movements of the input apparatus 200. The detector 210 may be a 9-axis sensor. Using 9-axis sensor, a yaw angle, a pitch angle, and a roll angle can be detected. This is merely an example. The detector 210 may detect the movements of the input apparatus 200 using other sensors (for example, an acceleration sensor).

The button 220 receives a user command for selecting an item or dragging an item. The button 220 may be provided on the exterior of the input apparatus 200.

The communicator 230 communicates with an external display apparatus 100. The communicator 230 may transfer at least one of movement information, coordinate value information, and a button selection command to the display apparatus 100.

The controller 240 receives the movements of the input apparatus 200 detected by the detector 210 and calculates a coordinate value of the location pointed by the input apparatus 200. In addition, the controller 240 compensates the calculated coordinate value using an instantaneous speed of the calculated coordinate value. More specifically, when the instantaneous speed of the calculated coordinate value is equal to or higher than a predetermined maximum value, the controller 240 may reflect the actual calculated coordinate value and transmit the calculated coordinate value to the external display apparatus 100. When the instantaneous speed of the input apparatus 200 at the calculated coordinate value is lower than a predetermined minimum value, the controller 240 may transmit information on a previous coordinate value to the display apparatus 100 so that the cursor does not move. When the instantaneous speed of the input apparatus 200 at the calculated coordinate value is equal to or higher than the minimum value and is lower than the maximum value, the controller 240 may replace the calculated coordinate value with a coordinate value ranging between the currently calculated coordinate value and the previously calculated coordinate value according to the determined instantaneous speed of the input apparatus 200, and transmit the compensated coordinate value to the display 120 of the display apparatus 100. At this time, as the instantaneous speed of the input apparatus 200 becomes closer to the maximum value, the controller 240 may compensate the coordinate value to become closer to the currently calculated coordinate value, and as the instantaneous speed of the input apparatus 200 becomes closer to the minimum value, the controller 240 may compensate the coordinate value to become closer to the previously calculated coordinate value.

When the button 220 is selected, the controller 240 may replace a coordinate value calculated after the button 220 is selected with a coordinate value of the stable position calculated before the button 220 is selected, and control the communicator 230 to transmit a button selection command and information on the coordinate value of the stable position to the display apparatus 100. Since an exemplary method for replacing the calculated coordinate value with the coordinate value of the stable position has been described above with reference to FIGS. 3 and 4, detailed description is not repeated.

A method for compensating coordinates using a display apparatus 100 is described below in detail with reference to FIGS. 6 and 7 according to an exemplary embodiment.

Figure 6:
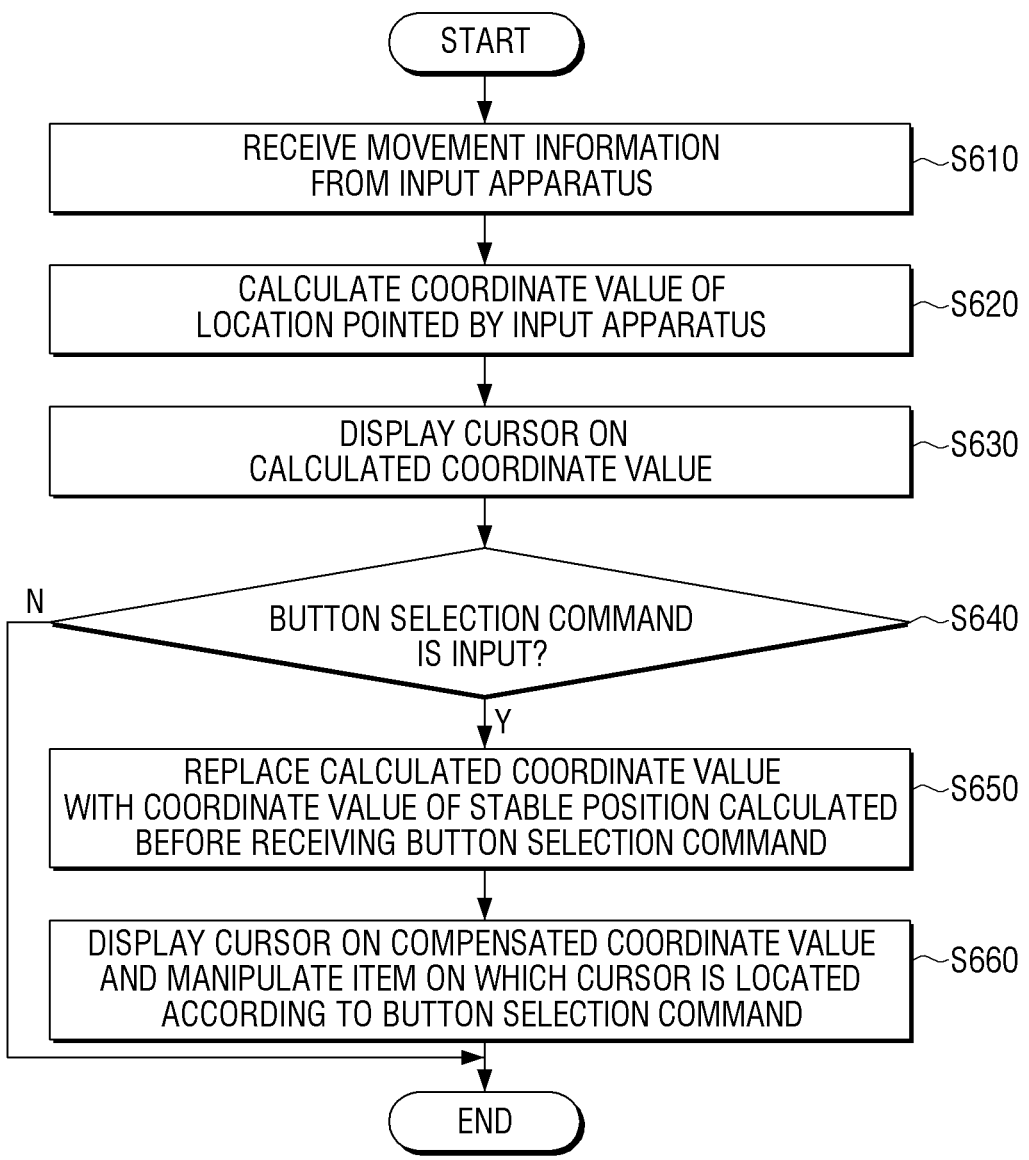
FIG. 6 is a flow chart illustrating a method for compensating coordinates using a display apparatus according to an exemplary embodiment.

FIG. 6 is a flow chart illustrating a method for compensating coordinates using a display apparatus 100 according to an exemplary embodiment.

In operation S610, the display apparatus 100 receives movement information from the input apparatus 200. The movement information of the input apparatus 200 may be movement information regarding at least one of a yaw angle, a pitch angle, and a roll angle of the input apparatus 200.

In operation S620, based on the movement information, the display apparatus 100 calculates a coordinate value of the location pointed by the input apparatus 200. In operation S630, the display apparatus 100 displays a cursor on the calculated coordinate value.

In operation S640, the display apparatus 100 determines whether a button selection command is input from the input apparatus 200.

When the button selection command is input from the input apparatus 200 in operation S640-Y, the display apparatus 100 replaces a coordinate value calculated after receiving the button selection command with a coordinate value of a stable position calculated before receiving the button selection command in operation S650. The coordinate value of the stable position may be a coordinate value of a section in which there is no changes in the calculated coordinate value during a predetermined period of time before receiving the button selection command.

In operation S660, the display apparatus 100 displays the cursor on the compensated coordinate value and manipulates an item on which the cursor is located according to the button selection command. More specifically, when the button selection command is a click, the display apparatus 100 executes the item, or when the button selection command is a drag, the display apparatus 100 moves the item along the movements of the input apparatus 200.

Figure 7:
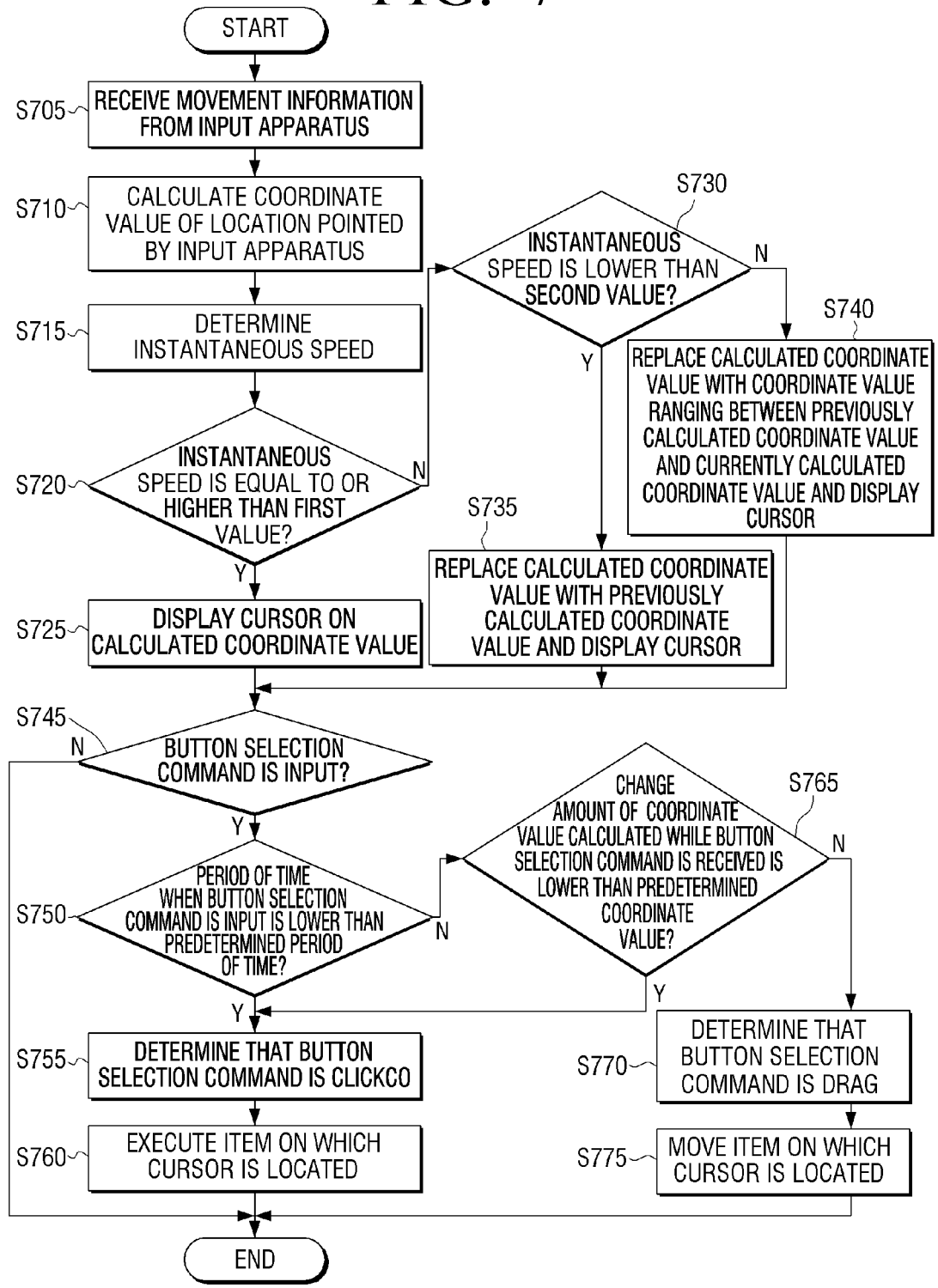
FIG. 7 is a flow chart illustrating a method for compensating coordinates using a display apparatus according to an exemplary embodiment.

FIG. 7 is a flow chart illustrating a method for compensating coordinates using a display apparatus 100 according to an exemplary embodiment.

In operation S705, the display apparatus 100 receives movement information from the input apparatus 200. The movement information of the input apparatus 200 may be movement information regarding at least one of a yaw angle, a pitch angle, and a roll angle of the input apparatus 200.

In operation S710, based on the movement information, the display apparatus 100 calculates a coordinate value of the location pointed by the input apparatus 200.

In operation S715, the display apparatus 100 determines an instantaneous speed of the input apparatus 200 at the calculated coordinate value.

In operation S720, the display apparatus 100 determines whether the instantaneous speed is equal to or higher than a first value.

When the instantaneous speed is equal to or higher than the first value in operation S720-Y, the display apparatus 100 displays a cursor on the actual calculated coordinate value in operation S725.

However, when the instantaneous speed is lower than the first value in operation S720-N, the display apparatus 100 determines whether the instantaneous speed is lower than a second value in operation S730.

When the instantaneous speed is lower than the second value in operation S730-Y, the display apparatus 100 replaces the calculated coordinate value with a previously calculated coordinate value and displays the cursor on the compensated coordinate value in operation S735. That is, when the instantaneous speed of the input apparatus 200 at the calculated coordinate value is lower than the first value, the display apparatus 100 does not move the cursor and maintains the location of the cursor.

When the instantaneous speed of the input apparatus 200 at the calculated coordinate value is equal to or higher than the second value in operation S730-N, the display apparatus 100 replaces the calculated coordinate value with a coordinate value ranging between the previously calculated coordinate value and the currently calculated coordinate value, and displays the cursor on the compensated coordinate value in operation S740. At this time, as the instantaneous speed becomes nearer to the first value, the display apparatus 100 may compensate the coordinate value to become nearer to the currently calculated coordinate value, and as the instantaneous speed becomes nearer to the second value, the display apparatus 100 may compensate the coordinate value to become nearer to the previously calculated coordinate value.

In operation S745, the display apparatus 100 determines whether a button selection command is input.

When a button selection command is input in operation S745-Y, the display apparatus 100 determines whether a period of time when the button selection command is input is lower than a predetermined period of time in operation S750. The predetermined period of time may be 1 second by way of an example only and not by way of a limitation.

When the period of time when the button selection command is received is lower than the predetermined period of time in operation S750-Y, the display apparatus 100 determines that the button selection command is a click in operation S755. Accordingly, the display apparatus 100 replaces a coordinate value calculated after receiving the button selection command with a coordinate value of the stable position calculated before receiving the button selection command, and displays the cursor on the compensated coordinate value. Subsequently, in operation S760, the display apparatus 100 executes an item on which the cursor is located.

When the period of time when the button selection command is input is equal to or higher than the predetermined period of time in operation S750-N, the display apparatus 100 determines whether a change amount of a coordinate value calculated while the button selection command is received is lower than a predetermined value in operation S765. When the change amount of the calculated coordinate value is lower than the predetermined value in operation S765-Y, the display apparatus 100 determines that the button selection command is a click in operation S755. In addition, the display apparatus 100 replaces a coordinate value calculated after receiving the button selection command with a coordinate value of the stable position calculated before receiving the button selection command, and displays the cursor on the compensated coordinate value. In operation S760, the display apparatus 100 executes an item on which the cursor is located.

However, when the change amount of the calculated coordinate value is equal to or higher than the predetermined value in operation S765-N, the display apparatus 100 determines that the button selection command is a drag in operation S770. Subsequently, in operation S775, the display apparatus 100 moves the item on which the cursor is located along the movements of the input apparatus 200.

According to the method for compensating coordinates using the display apparatus 100 as described above according to an exemplary embodiment, the user may minimize errors caused when selecting a button and manipulate the cursor with more ease.

A method for compensating coordinates using an input apparatus 200 according to an exemplary embodiment is described below in detail with reference to FIG. 8.

In operation S810, the input apparatus 200 detects movement information. The movement information may be detected using a 9-axis sensor, and the movement information may include movement information regarding at least one of a yaw angle, a pitch angle, and a roll angle.

In operation S820, the input apparatus 200 calculates a coordinate value of the location pointed to by the input apparatus 200 based on the detected movement information. At this time, the input apparatus 200 may compensate the calculated coordinate value using the instantaneous speed of the input apparatus at the calculated coordinate value. The method for compensating the calculated coordinate value using the instantaneous speed of the input apparatus according to an exemplary embodiment has been described above with reference to FIGS. 2 to 4, so detailed description is not repeated.

Subsequently, in operation S830, the input apparatus 200 determines whether a button 220 is selected.

When the button 220 is selected in operation S830-Y, the input apparatus 200 replaces a coordinate value calculated after the button 220 is selected with a coordinate value of a stable position calculated before the button 220 is selected in operation S840.

In operation S850, the input apparatus 200 transfers/transmits the compensated coordinate value and the button selection command to the display apparatus 100.

However, when the button 220 is not selected in operation S830-N, the input apparatus 200 transfers the calculated coordinate value to the display apparatus 100 in operation S860.

FIG. 10 is a sequence diagram illustrating a method for compensating a coordinate of a display system according to an exemplary embodiment.

First, the input apparatus 200 receives information about the movements of the input apparatus 200 (in operation S1010). At this time, the input apparatus 200 can be an input apparatus of an absolute mapping method.

The input apparatus 200 transmits the received information about movements to the display apparatus 100 (in operation S1020).

The display apparatus 100 calculates a coordinate value based on the received information about movements (in operation S1030). At this time, the display apparatus 100 can compensate a coordinate value according to instantaneous speed of the input apparatus 200. The display apparatus 100 displays a cursor on the calculated coordinate value or the compensated coordinate value (in operation S1035).

The input apparatus 200 receives a button selection command (in operation S1040). In addition, the input apparatus 200 transmits a button selection command to the display apparatus 100 (in operation S1050).

The display apparatus 100 compensates a coordinate value calculated after receiving a button selection command to a coordinate value of the stable position before receiving a button selection command (in operation S1060). At this time, a coordinate value of the stable position can be a coordinate value of a section with no change of a coordinate value calculated during a predetermined time before receiving a button selection command.

In addition, the display apparatus 100 displays a cursor on a compensated coordinate value (in operation S1070), and manipulates an item according to a button selection command (in operation S1080). For example, when a button selection command is a click command, the display apparatus 100 executes an item where a cursor is located, and when a button selection command is a drag command, the display apparatus 100 can move an item where a cursor is located along the direction of movement of the input apparatus 200.

Meanwhile, in the above-described exemplary embodiment, a coordinate value after receiving a button selection command is compensated by the display apparatus 100 to a coordinate value of a stable position, but this is merely an exemplary embodiment, and a coordinate value after receiving a button selection command can be compensated by the input apparatus 200 to a coordinate value of a stable position.

Hereinbelow, an exemplary embodiment where the input apparatus 200 compensates a coordinate value in reference to FIG. 11 will be described.

First, the input apparatus 200 receives information about movements of the input apparatus 200 (in operation S1110). At this time, the input apparatus 200 can be an apparatus of an absolute mapping method according to an exemplary embodiment.

The input apparatus 200 transmits the received information about movements to the display apparatus 100 (in operation S1120).

The display apparatus 100 calculates a coordinate value based on the received information about movements (in operation S1130). In this case, the display apparatus 100 can compensate a coordinate value according to instantaneous speed of the input apparatus 200. The display apparatus 100 displays a cursor on the calculated coordinate value or the compensated coordinate value (in operation S1140).

The display apparatus 100 transmits the calculated coordinate value to the input apparatus 200 (in operation S1150).

The input apparatus 200 receives a button selection command (in operation S1160). When a button selection command is input, the input apparatus 200 compensates a coordinate value calculated after receiving a button selection command to a coordinate value of a stable position before receiving a button selection command (in operation S1170).

And, the input apparatus 200 transmits a button selection command and a coordinate value of stable position to the display apparatus 100 (in operation S1180).

The display apparatus 100 displays a cursor on the compensated coordinate value (in operation S1190), and manipulates an item according to a button selection command (in operation S1195).

The method for compensating coordinates using a display apparatus or an input apparatus according to various exemplary embodiments may be implemented in a program and be provided to display apparatuses and/or input apparatuses. In particular, a program including the method for compensating coordinates using a display apparatus may be stored in a non-transitory computer readable medium and be provided.

A non-transitory computer readable medium is a medium which does not store data temporarily such as a register, cash, and memory but stores data semi-permanently and is readable by devices. More specifically, the aforementioned various applications or programs may be stored and provided in a non-transitory computer readable medium such as a compact disk (CD), digital video disk (DVD), hard disk, Blu-ray disk, universal serial bus (USB), memory card, and read-only memory (ROM).

The foregoing exemplary embodiments are merely exemplary and are not to be construed as limiting. Exemplary embodiments can be readily applied to other types of apparatuses. Also, the description of the exemplary embodiments is intended to be illustrative, and not to limit the scope of the claims, and many alternatives, modifications, and variations will be apparent to those skilled in the art. It is understood that all possible changes and/or modifications in form and details may be made therein without departing from the spirit and scope of an inventive concept as defined by the appended claims and their equivalents. The scope is defined not by the detailed description of exemplary embodiments but by the appended claims, and their equivalents and all differences within the scope will be construed as being included in an inventive concept.

What is claimed is:

1. A method for compensating coordinates of a display system, the method comprising:
    receiving movement information and transmitting, by an input apparatus, the received movement information to a display apparatus;
    calculating, by the display apparatus, a coordinate value based on the received movement information;
    displaying a cursor on the calculated coordinate value;
    in response to receiving a button selection command, compensating, by the display apparatus, a coordinate value calculated after receiving the button selection command;
    displaying the cursor on the compensated coordinate value; and
    manipulating an item on which the cursor is located based on the button selection command,
    wherein the displaying comprises:
    additionally compensating the coordinate value calculated after receiving the button selection command according to an instantaneous speed of movements of the input apparatus; and
    displaying the cursor compensated by said additional compensating,
    wherein the additional compensating comprises:
        when the instantaneous speed is higher than a first predetermined value, displaying the cursor by reflecting the coordinate value calculated after receiving the button selection command, and when the instantaneous speed is lower than the second predetermined value, compensating the coordinate value calculated after receiving the button selection command to the previously calculated coordinate value and displaying the cursor on the previously calculated coordinate value.

2. The method as claimed in claim 1, wherein said compensating comprises compensating the calculated coordinate value to a coordinate value of a stable position in which no change of the calculated coordinate value exists during a predetermined period of time before receiving the button selection command.

3. The method as claimed in claim 1, wherein said compensating comprises when a button selection command is received from the input apparatus while the cursor is located on an item and when the coordinate value calculated after receiving the button selection command is outside a location of the item, compensating the coordinate value to be within the item if the coordinate value is in a stable position and within the item before said receiving of the button selection command.

4. The method as claimed in claim 1, wherein said additional compensating comprises:
    when the instantaneous speed is higher than the second predetermined value and lower than the first predetermined value, adding a weighted value according to the instantaneous speed and compensating the calculated coordinate value.

5. The method as claimed in claim 1, wherein the compensating further comprises:
    determining whether the button selection command is a click command or a drag command by determining at least one of a period of time when the button selection command is received and the change amount of the coordinate value calculated during the receiving of the button selection command.

6. The method as claimed in claim 5, the determining comprises, when the period of time the button selection command is received is lower than a predetermined period of time, or when the period of time when the button selection command is received is higher than a predetermined period of time, and when the change amount of the calculated coordinate value during receiving the command is lower than a predetermined value, determining the button selection command as a click command.

7. The method as claimed in claim 5, the determining comprises, when the period of time the button selection command is received is higher than a predetermined period of time, and when the change amount of the calculated coordinate value during receiving the command is higher than a predetermined value, determining the button selection command as a drag command.

8. The method as claimed in claim 5, the manipulating comprises, when the button selection command is a click command, executing an item on which the cursor is located, and when the button selection command is a drag command, moving the item on which the cursor is located along manipulation of the input apparatus.

9. The method as claimed in claim 1, wherein the input apparatus is an input apparatus of an absolute mapping method which displays a coordinate value at a location pointed by the input apparatus.

10. The method as claimed in claim 1, wherein said compensating comprises compensating, by the display apparatus, the coordinate value calculated after receiving the button selection command using angular speed of movement of the input apparatus.

11. A display apparatus comprising:
    a display configured to display at least one of a cursor and an item;
    a communicator configured to communicate with an external input apparatus; and
    a controller configured to calculate a coordinate value based on movement information of the input apparatus received through the communicator, configured to control the display to display the cursor on the calculated coordinate value, and when a button selection command is received from the input apparatus through the communicator, configured to compensate a coordinate value calculated after receiving the button selection command and configured to control the display to display the cursor on the replaced coordinate value,
    wherein the controller controls the display to additionally compensate the coordinate value calculated after receiving the button selection command according to an instantaneous speed of movements of the input apparatus and controls the display to display a cursor on the additionally compensated coordinate value, wherein the controller, when the instantaneous speed is higher than a first predetermined value, displays the cursor by reflecting the coordinate value calculated after receiving the button selection command, and when the instantaneous speed is lower than a second predetermined value, compensates coordinate value calculated after receiving the button selection command to the previously calculated coordinate value.

12. The display apparatus as claimed in claim 11, wherein the controller compensates the calculated coordinate value to a coordinate value of a stable position in which no change to the calculated coordinate value exists during a predetermined period of time before receiving the button selection command.

13. The display apparatus as claimed in claim 11, wherein the controller, when a button selection command is received from the input apparatus while the cursor is located on an item and the coordinate value calculated after receiving the button selection command is outside a location of the item, compensates the coordinate value to be within the item if the coordinate value is in a stable position within the location of the item before receiving the button selection command.

14. The display apparatus as claimed in claim 11, wherein the controller, when the instantaneous speed is higher than the second predetermined value and lower than the first predetermined value, adds a weighted value according to the instantaneous speed and compensates the calculated coordinate value.

15. The display apparatus as claimed in claim 11, wherein the controller determines whether the button selection command is a click command or a drag command by determining at least one of a period of time when the button selection command is received and the change amount of the coordinate value calculated during receiving the button selection command.

16. The display apparatus as claimed in claim 15, wherein the controller, when the period of time when the button selection command is received is lower than a first predetermined period of time, or when the period of time when the button selection command is received is higher than a second predetermined period of time, and when the change amount of the calculated coordinate value during receiving the command is lower than a third predetermined value, determines the button selection command as a click command.

17. The display apparatus as claimed in claim 15, wherein the controller, when the period of time when the button selection command is received is higher than a first predetermined period of time, and when the change amount of the calculated coordinate value during receiving the command is higher than a second predetermined value, determines the button selection command as a drag command.

18. The display apparatus as claimed in claim 15, wherein the controller, when the button selection command is a click command, executes an item on which the cursor is located, and when the button selection command is a drag command, moves the item on which the cursor is located along manipulation of the input apparatus.

19. The display apparatus as claimed in claim 11, wherein the input apparatus is an input apparatus of an absolute mapping method which displays a coordinate value at a location pointed by the input apparatus.

20. The display apparatus as claimed in claim 11, wherein the controller compensates the calculated coordinate value after receiving the button selection command using angular speed of movement of the input apparatus.

21. A method for compensating coordinates of an input apparatus, the method comprising:

detecting, by the input apparatus, movements of the input apparatus and calculating a coordinate value of a location pointed by the input apparatus;

when a button provided on the input apparatus is selected, compensating by the input apparatus a coordinate value calculated after the button is selected to a coordinate value of a stable position calculated before the button is selected; and transmitting, by the input apparatus, a button selection command of the input apparatus and information about the coordinate value of the stable position to an external display apparatus, wherein the method further comprises:

additionally compensating by the input apparatus the coordinate value calculated after the button is selected to a coordinate value according to an instantaneous speed of movements of the input apparatus; and transmitting, by the input apparatus, information about the additionally compensated coordinate value to the external display apparatus, wherein the additional compensating comprises:

when the instantaneous speed is higher than a first predetermined value, displaying the cursor by reflecting the coordinate value calculated after receiving the button selection command, and when the instantaneous speed is lower than the second predetermined value, compensating the coordinate value calculated after receiving the button selection command to the previously calculated coordinate value and displaying the cursor on the previously calculated coordinate value.

22. An input apparatus to control a cursor displayed on a display apparatus, the input apparatus comprising:

a button configured to receive a selection command;

a detector configured to detect movements of the input apparatus;

a communicator configured to communicate with the display apparatus; and a controller configured to receive movements of the input apparatus detected by the detector and configured to calculate a coordinate value of a location pointed by the input apparatus, and when the button is selected, configured to replace a coordinate value calculated after the button is selected with a coordinate value of a stable position calculated before the button is selected, and controls the communicator to transmit the selection command and information about the replaced coordinate value to the display apparatus, wherein the controller controls the display to additionally replace the coordinate value calculated after the button is selected with a coordinate value according to an instantaneous speed of movements of the input apparatus and controls the communicator to transmit the additionally replaced coordinate value to the display apparatus, wherein the additionally replacing comprises:

when the instantaneous speed is higher than a first predetermined value, displaying the cursor by reflecting the coordinate value calculated after receiving the button selection command and when the instantaneous speed is lower than the second predetermined value, replacing the coordinate value calculated after receiving the button selection command to the previously calculated coordinate value and displaying the cursor on the previously calculated coordinate value.

23. A display system, comprising:
an input apparatus configured to detect information about movements and receive a button transmission command; and
a display configured to receive the detected information about movements from the input apparatus, display a cursor on the calculated coordinate value,
wherein the display, when a button selection command is received from the input apparatus, is configured to compensate a coordinate value calculated after receiving the button selection command to a coordinate value of the stable position before receiving the button selection command and configured to display a cursor on the compensated coordinate value, and configured to manipulate an item on which the cursor is located according to the button selection command, and
wherein the display is further configured to additionally compensate the coordinate value calculated after receiving the button selection command according to an instantaneous speed of movements of the input apparatus and controls the display to display a cursor on the additionally compensated coordinate value,
wherein the additional compensating comprises:
when the instantaneous speed is higher than a first predetermined value, displaying the cursor by reflecting the coordinate value calculated after receiving the button selection command and when the instantaneous speed is lower than the second predetermined value, compensating the coordinate value calculated after receiving the button selection command to the previously calculated coordinate value and displaying the cursor on the previously calculated coordinate value.

* * * * *